United States Patent

Moore

(10) Patent No.: US 8,838,713 B2
(45) Date of Patent: Sep. 16, 2014

(54) USER NOTIFICATION

(75) Inventor: Nigel Stuart Moore, Newbury (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 123 days.

(21) Appl. No.: 13/417,782

(22) Filed: Mar. 12, 2012

(65) Prior Publication Data

US 2012/0246246 A1    Sep. 27, 2012

(30) Foreign Application Priority Data

Mar. 21, 2011   (GB) .................................. 1104685.1

(51) Int. Cl.
  | | |
  |---|---|
  | G06F 15/16 | (2006.01) |
  | H04N 21/433 | (2011.01) |
  | H04N 21/4788 | (2011.01) |
  | H04N 21/45 | (2011.01) |
  | H04N 21/466 | (2011.01) |
  | H04N 21/488 | (2011.01) |

(52) U.S. Cl.
CPC ....... *H04N 21/4333* (2013.01); *H04N 21/4788* (2013.01); *H04N 21/4532* (2013.01); *H04N 21/4667* (2013.01); *H04N 21/4882* (2013.01)
USPC ........ 709/206; 709/207; 725/135; 455/412.2; 455/414.1; 715/733

(58) Field of Classification Search
USPC ................ 709/206, 207; 725/135; 455/412.2, 455/414.1; 715/733
See application file for complete search history.

(56) References Cited

U.S. PATENT DOCUMENTS

| | | | | |
|---|---|---|---|---|
| 7,698,729 | B2* | 4/2010 | Miyata ......................... | 725/151 |
| 2002/0104095 | A1* | 8/2002 | Nguyen et al. ................ | 725/110 |
| 2002/0124252 | A1 | 9/2002 | Schaefer et al. | |
| 2003/0070182 | A1* | 4/2003 | Pierre et al. .................... | 725/135 |
| 2004/0010808 | A1* | 1/2004 | deCarmo ....................... | 725/139 |
| 2004/0176081 | A1* | 9/2004 | Bryham et al. ............. | 455/414.1 |
| 2004/0268263 | A1* | 12/2004 | Van Dok et al. .............. | 715/733 |
| 2008/0294772 | A1* | 11/2008 | Hagale et al. ................. | 709/224 |
| 2009/0017792 | A1* | 1/2009 | Matsumoto et al. ........ | 455/412.2 |
| 2009/0172113 | A1* | 7/2009 | Srikanth et al. ............... | 709/206 |
| 2010/0138858 | A1 | 6/2010 | Velazquez et al. | |

OTHER PUBLICATIONS

United Kingdom Search Report issued on Jul. 14, 2011 in corresponding United Kingdom Application No. 1104685.1 filed on Mar. 21, 2011.

* cited by examiner

*Primary Examiner* — Michael C Lai

(74) *Attorney, Agent, or Firm* — Oblon, Spivak, McClelland, Maier & Neustadt, L.L.P.

(57) ABSTRACT

A data processing device comprises a notification controller configured to provide notification to a user in response to a data processing event at that device or another device to which that device is connected; and a user interface by which the user can attend to a user notification to carry out a data processing task relating to the notified data processing event; the notification controller being configured to inhibit further notifications while the user is attending to a current notification using the user interface.

14 Claims, 6 Drawing Sheets

USER NOTIFICATION

CROSS REFERENCE TO RELATED APPLICATION

The present application claims the benefit of the earlier filing date of GB1104685.1m filed in the United Kingdom Patent Office on 21 Mar. 2011, the entire contents of which application are incorporated herein by reference.

BACKGROUND

1. Field of the Invention

This invention relates to user notifications.

2. Description of the Related Art

A user of a networked or connected device may receive audio and/or video notifications or alerting messages ("alerts") about events relating to that device or to other networked devices.

Here, the term "networked device" or "connected device" implies that the device is connectable, for example by an electrical cable, by an optical connection, wirelessly or by combinations of these, to at least one other device. In many instances such a connection may be via an internet connection or via a unidirectional broadcast connection from, for example, a content provider to the device, via a short range wireless connection (for example, a Bluetooth® connection, a wireless network ("WiFi") connection or any other appropriate wireless protocol connection) with a portable device such as a mobile telephone, or via a combination of these. The device could be, for example, a television or radio receiver, a computer terminal, a mobile telephone or personal digital assistant or the like.

Considering a television receiver as an example of such a networked device, it is known for television receivers to be connectable to the internet and to interact with internet-based services such as email services, video playback services, instant messaging services and the like.

There are many ways in which user notifications may arise in systems like this. For example, a user's television receiver may be running an internet based email application. The email application runs as a background task and so it is normally invisible to the user. However, when an email message arrives for the user, the email application may place a small temporary notification within the displayed image. The user may choose whether or not to interact with that notification in order to open the email message and launch the full screen email application. Another example relates to system notifications. Some television receivers or other devices may display status notifications such as "you have lost your internet connection".

It is known to provide the user with the facility to suppress such notifications. In this case, the notifications may be buffered, so that when the user allows notifications once again, the user may be provided with access to notifications received during the suppression period.

SUMMARY

The foregoing paragraphs have been provided by way of general introduction, and are not intended to limit the scope of the following claims. The described embodiments, together with further advantages, will be best understood by reference to the detailed description below taken in conjunction with the accompanying drawings.

This invention provides a data processing device comprising:

a notification controller configured to provide notification to a user in response to a data processing event at that device or another device to which that device is connected; and a user interface by which the user can attend to a user notification to carry out a data processing task relating to the notified data processing event;

the notification controller being configured to inhibit further notifications while the user is attending to a current notification using the user interface.

The invention recognises that while some notifications can be useful and appreciated by the user, it can be annoying to receive a series of notifications such that further notifications actually interrupt the user's attention from the first notification.

The invention addresses this problem by inhibiting (for example, delaying or preventing) the provision of subsequent notifications until the user has finished attending to a current notification.

US 2002/0124252 A1 provides a television receiver which allows a user to establish a "profile" defining types of alerts which are allowed to be displayed during the viewing of particular television channels or particular programmes. However, the problem remains of how to handle multiple closely spaced alerts of a particular "allowed" alert type.

US 2010/0138858 A1 provides a television receiver in the context of an emergency alert system, whereby the television receiver can automatically delay the display of broadcast alert messages relating to potential dangers (such as bad weather) affecting a user. The delay could be applied, for example, so that display of the notification is deferred until the currently viewed programme is interrupted by a commercial or advertisement. Once again, however, the problem remains that the queued alerts may be provided at very close instants in time, so the earlier alerts may be hard for the user to follow.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
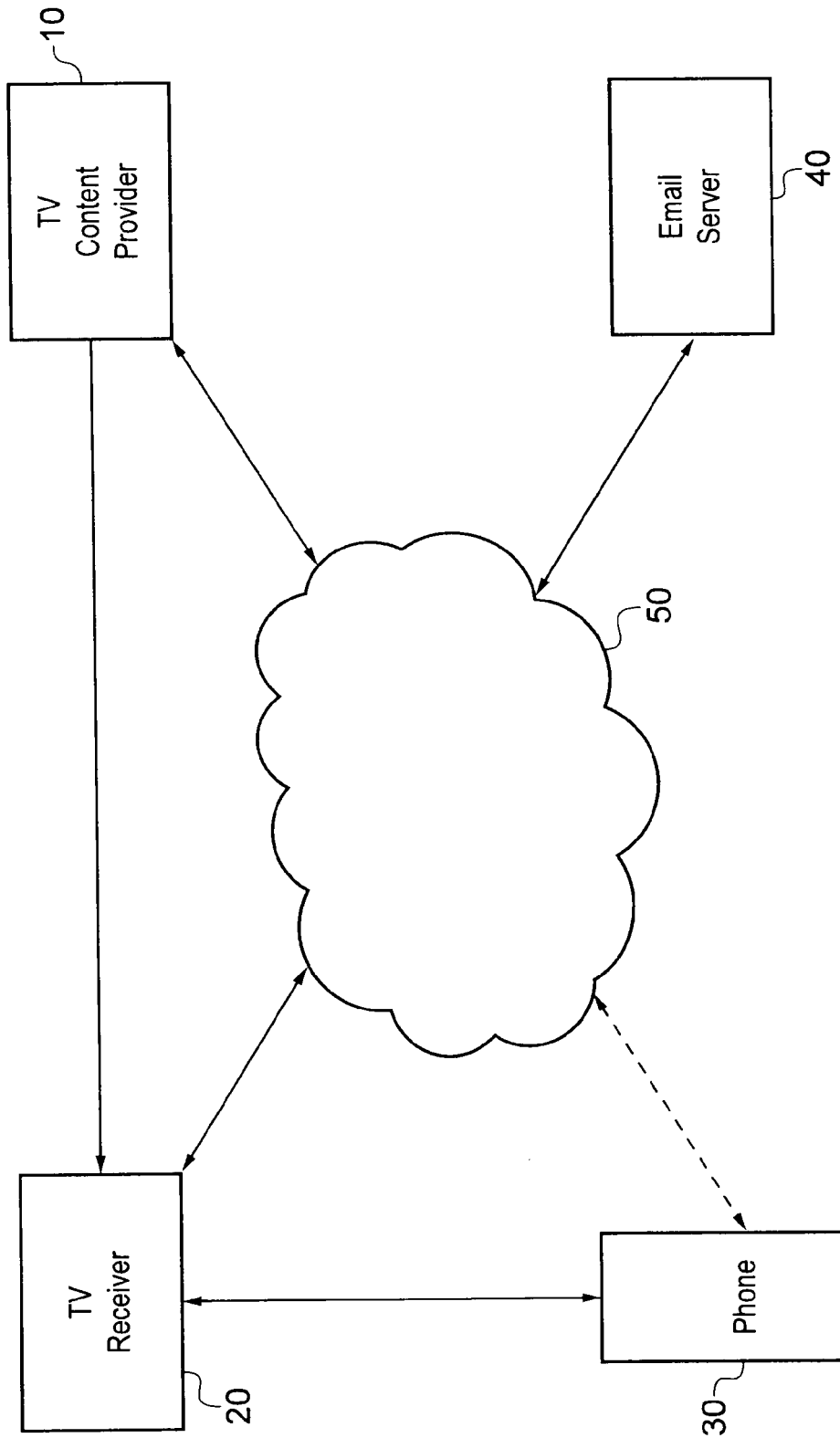
FIG. 1 schematically illustrates a set of networked devices.

Referring now to the drawings, wherein like reference numerals designate identical or corresponding parts throughout the several views, FIG. 1 schematically illustrates a set of networked devices. Just a small number of devices are illustrated, for clarity of the diagram. These devices are: a television (TV) content provider 10, a TV receiver 20, a mobile telephone 30 and an email server 40. All of the devices can communicate via the internet 50. In addition, there is a unidirectional broadcast signal path from the TV content provider 10 to the TV receiver 20, a short range (such as Bluetooth®) wireless link between the TV receiver 20 and the mobile telephone 30, and a wireless link (not shown) between the mobile telephone 30 and a cellular telephone network (not shown).

Of course, the diagram is shown in simplified form. For example, it will be appreciated that often there is a bidirectional link between a TV content provider and a TV receiver, with programme orders, control messages and statistics passing back from the TV receiver to the TV content provider. There would in also of course be many more than four nodes in a real network of this type.

The broadcast path from the TV content provider to the TV receiver may be a terrestrial wireless link, a satellite wireless link, an electrical or optical cable link, or even a combination of these.

The TV content provider sends electronic programme guide (EPG) data to the TV receiver 20. The receiver can display the EPG data to the user, who can then do various things such as selecting a TV channel to watch now, or setting a reminder by selecting a scheduled programme to watch at a later time.

The TV receiver 20 is arranged to access emails held on the email server 40, via its internet connection. To do this, the TV receiver runs an email application program which either checks the email server 40 for new emails at periodic intervals, or receives new emails as so-called "push" messages, initiated by the email server, whenever a new email appears on the email server. The email server is just one example of the many internet-based services which the TV receiver 20 may access, including video replay services, social networking services and the like.

The TV receiver 20 is an example of a receiver arranged to receive, and to play as a user output, audio/video content transmitted by a content provider.

Figure 2:
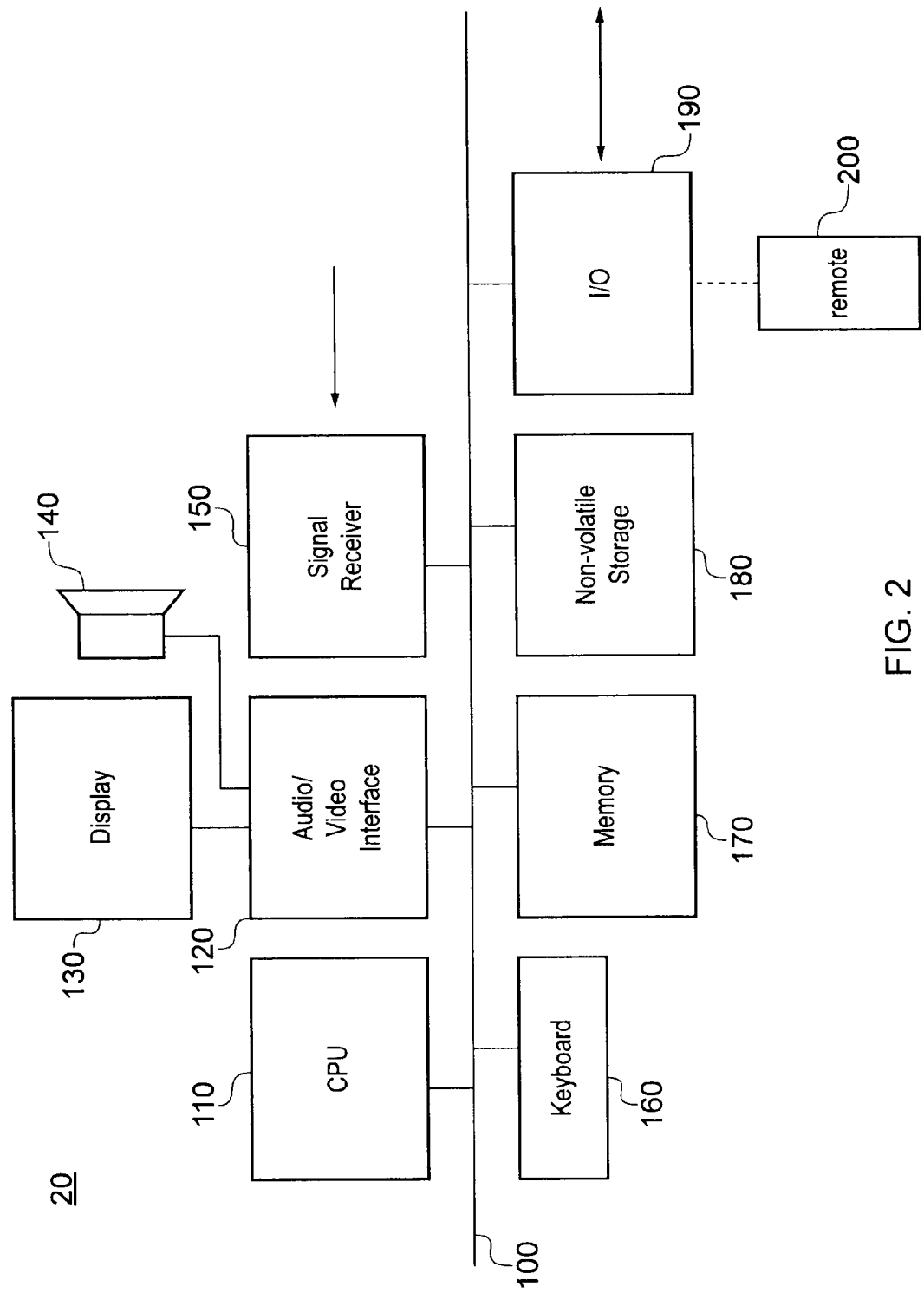
FIG. 2 schematically illustrates a television receiver.

FIG. 2 schematically illustrates a television receiver as an example of a networked device. The TV receiver 20 shown in FIG. 2 comprises a bus 100 to which the following are connected: a central processing unit (CPU) 110, an audio/video (NV) interface 120 which in turn is connected to a display screen 130 and a loudspeaker 140, a signal receiver 150 for receiving the broadcast television signal from the TV content provider 10, an optional keyboard 160 (which may be built into the casing of the television receiver), a memory 170, non-volatile storage 180 and an input/output (I/O) controller 190 which establishes an internet connection, a wireless connection with a remote controller 200, and a wireless connection with the mobile telephone 30.

In operation, the CPU operates under the control of software which may be stored in the non-volatile storage 180, to control functions of the TV receiver and/or to manipulate data which can be temporarily stored in the memory 170. However, of course, the TV receiver could operate, at least in part, as hardware or semi-programmable hardware such as application specific integrated circuits or field programmable gate arrays.

The software can, for example, relate to signal processing functions applied to video and audio signals received by the signal receiver 150. Other features of the software can relate to communication with other connected devices such as the email server 40. In these types of function, the software can be substantially conventional. That is to say, the way in which the TV receiver 20 interacts with (for example) the email server conforms to the normal interaction of an email client with an email server, except with regard to specific functions to be described in detail below.

A further function of the software, which is of particular relevance to the present embodiments, relates to the handling of user alerts or notifications.

Figure 3:
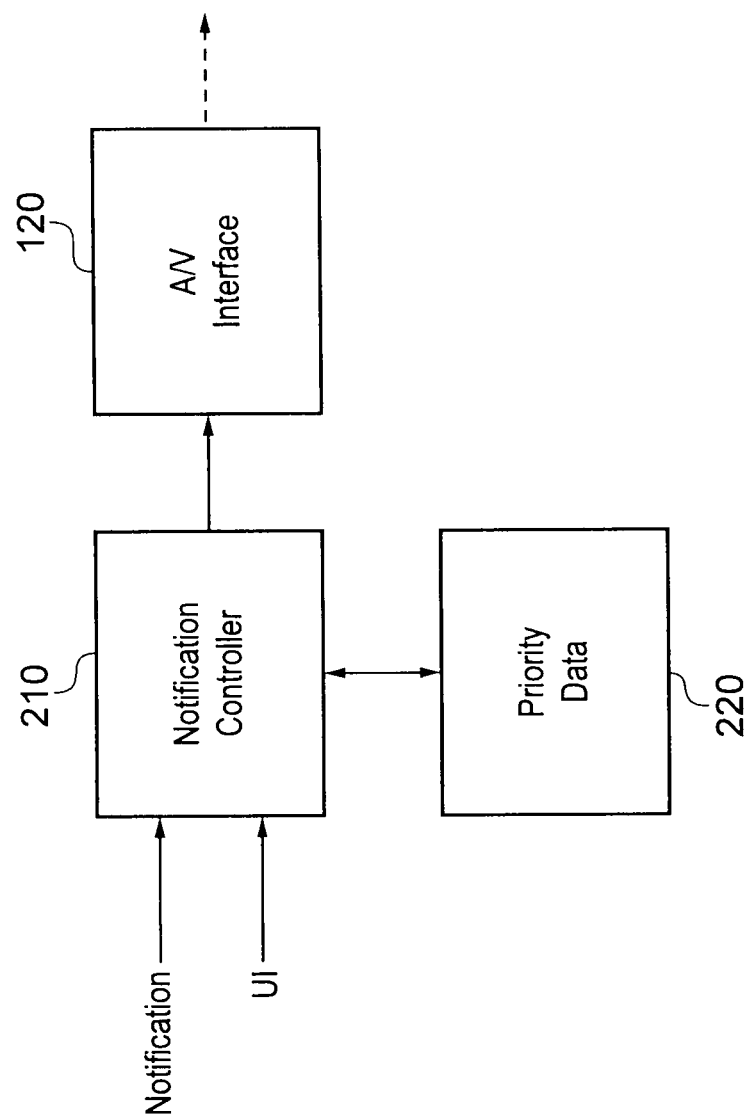
FIG. 3 is a schematic diagram illustrating the handling of user notifications by the television receiver of FIG. 2.

FIG. 3 is a schematic diagram illustrating the handling of user notifications. In particular, FIG. 3 shows a notification controller 210 which receives notification data (the source of such data being described below) and user interface (UI) data from the keyboard 160 or the remote controller 200, and optionally interacts with stored priority data 220. An output from the notification controller passes to the A/V interface 120.

The notification controller 210 is thus configured to provide notification to a user in response to a data processing event (such as initiation of a communication, an error, a reminder and the like) at that device or another device to which that device is connected. In general terms, a data processing event at a device represents an event occurring by means of that device, whether initiated by another user, a timer, an action at another data processing device or a change in the state of that data processing device.

It will be understood that whereas FIG. 2 illustrates the structure of the TV receiver 20, FIG. 3 is another view of those same structural elements, but expressed in a way that will allow a discussion of the logical interaction of different functions within the TV receiver. It will therefore be understood that the notification controller 210 may in fact be implemented by the CPU 110 running appropriate software, that the priority data 220 may in fact be stored in an appropriate portion of the memory 170, and that interactions between the functional units shown in FIG. 3 may correspond to data and other communications over the bus 100.

The operation of the TV receiver in respect of user notifications will now be described with reference to FIGS. 4a to 4d and 5.

Figure 4B:
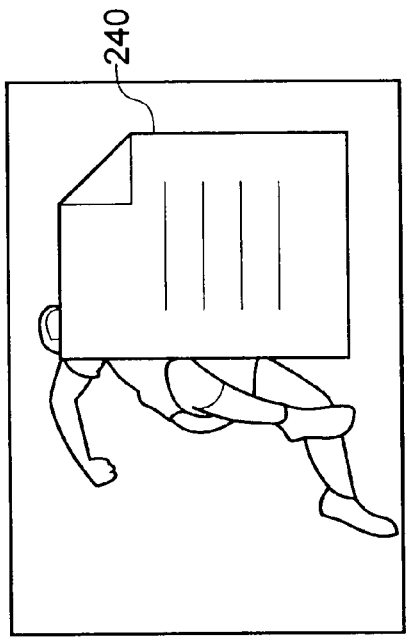
FIGS. 4*a* to 4*d* schematically illustrate a user interacting with user notifications.
Figure 4D:
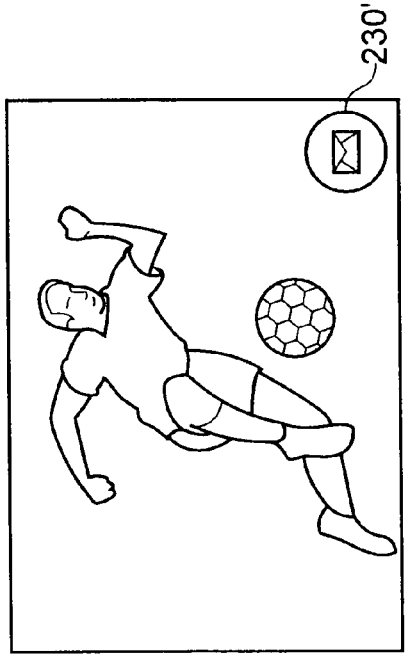
Figure 4A:
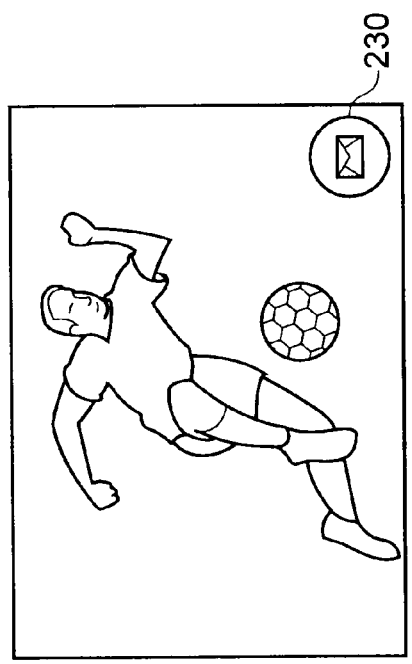

FIG. 4a is a schematic illustration of a television image (of a soccer game) displayed on the display 130 of the TV receiver 20. The TV receiver 20 interacts with an email server such as the email server 40 on behalf of the user. In doing this, the TV receiver 20 either receives a notification from the email server that a new email is waiting on the email server or, more usually, retrieves the new email from the email server and then generates a notification for display to the user in order to let the user know that the email has arrived. An example 230 of such a displayed notification is illustrated schematically as an overlay on the displayed television image.

It will be appreciated that audible notifications could be used instead of or in addition to the displayed notifications. It will also be appreciated that the notifications could be provided on another device, for example a notification relating to the TV receiver could be provided on the mobile telephone 30.

The displayed notification 230 is generated by the notification controller 210. The notification controller responds to the receipt of notification data—in this case, from the email application of the TV receiver 20—to generate the displayed notification 230.

The user has the choice to ignore the notification 230, in which case the notification controller 210 can be arranged so that the notification is removed after a predetermined period (such as 30 seconds) of being ignored, or alternatively the notification controller 210 can be arranged so that the ignored notification remains visible indefinitely if it is ignored. Here, "indefinitely" could mean any of: until the TV receiver is switched off; until another notification is received; or until the user eventually deals with the notification.

Another choice on the part of the user is to dismiss the notification. This is sometimes presented as a selectable option when a notification is displayed. Dismissing the notification does not necessarily affect the underlying cause of the notification; for example, dismissing a notification that a new email has arrived would not be expected to cause the deletion of that email. But dismissing a notification would cause the notification controller 210 to remove the visible notification 230 from the display.

A further option is that the user attends to the notification. This means that the user does something in response to the notification, other than merely dismissing it. For example, if the notification relates to an incoming email, the user may elect (for example by selecting a menu command associated with the displayed notification 230, or simply by moving a cursor to the displayed notification 230) to read the corresponding email. This situation is illustrated schematically in FIG. 4b, where the user has elected to read an email which is shown on the screen as a displayed message 240. In general, carrying out a data processing task to attend to a notification relating to a data processing event involves the user interacting, via a user interface, with the notification and/or with the device in respect of the notified data processing event.

Accordingly, items such as the keyboard 160 and the remote commander 200 can provide a user interface by which the user can attend to a user notification to carry out a data processing task relating to the notified data processing event.

Note that the drawings of FIGS. 4a to 4d are shown with the same underlying video image of the soccer player. In practice, the video material of a moving soccer player may have changed between the time that the displayed notification 230 appeared and the time that the user opens the corresponding message 240, but the same image is used simply for schematic purposes.

The period which the user spends reading the displayed email message 240 and potentially responding to it is referred to as time when the user is attending to the notification. That is to say, the user is taking substantive action using the TV receiver 20 in response to a displayed notification. In the arrangements to be described below, this act of attending to the notification could be taken to relate only to dealing with the specific underlying cause of the notification (for example, a specific email) or could be taken to refer to the total continuous time that the user keeps the email application open after responding to a notification.

Figure 4C:
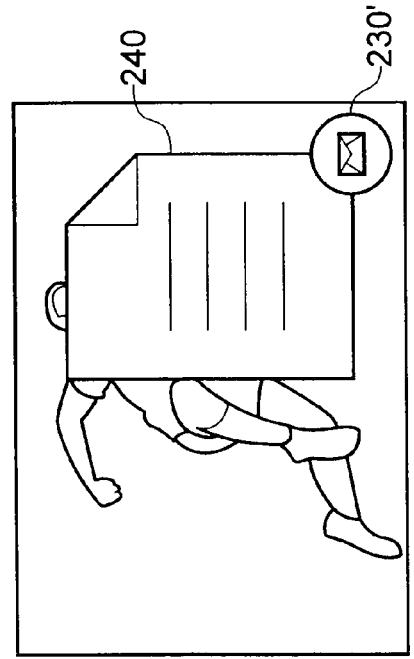

FIG. 4c schematically illustrates an undesirable situation, in which the user is attending to a first notification by reading or responding to an email displayed as a message 240, when another notification 230' is displayed by the notification controller 210. This is a situation which the present embodiments aim to avoid. The user is in danger of being successively distracted from attending to the first notification by the subsequent notifications.

Accordingly, in embodiments of the invention, the display (by the notification controller 210) of a subsequent notification 230' is inhibited until the user is detected to have finished attending to the first notification, for example by closing or minimising (reducing to an icon) the email application. Referring to FIG. 4d, once the user has finished attending to a current notification, the notification controller is allowed to display a subsequent notification 230'. In this way the notification controller 210 is configured to inhibit further notifications while the user is attending to a current notification using the user interface.

An example of a process behind this technique will now be described with reference to the schematic flowchart of FIG. 5.

At a step 300, either information regarding a data processing event causing a new notification is received by the notification controller 210, or a detection is made by the notification controller 210 that a notification is held in a queue (see below).

At a step 310, the notification controller 210 detects whether the user is attending to a previous notification. This is abbreviated in FIG. 5 to the generic question "UI busy?" and can in some embodiments simply involve a test (a) as to whether an application (such as an email or social networking application) is currently running in an active mode, that is to say, a mode in which the application is displayed in such a way that the user may enter data into or view data from that application. (To avoid doubt, in embodiments of the invention the mere presence of a notification icon such as the icon 230, without any associated action having been taken by the user, is not considered to represent the UI being busy).

In more involved embodiments, a secondary test (b) can be applied as to whether such a currently open application relates to the previously received notification. So, for example, if the previously received notification related to an incoming email and the currently open application is an email tool, then the user is considered to be attending to the notification until the email tool is minimised or closed.

A further level of testing is to detect (c) whether an actual email that the user is viewing is either the email for which the notification was displayed, or a reply to that email. Or in the case of a social networking notification, is the user currently viewing information about the person to whom the notification related?

A subtle further level of testing as to whether the user is attending to the notification is to detect (d) the time elapsed since the user last issued a UI command, such as typing a character or moving a cursor. If this time exceeds a predetermined threshold (such as one minute) then the user can be considered no longer to be attending to the notification.

These tests (a) to (d) are just examples of how the notification controller, interacting with other processes operated by the CPU 110 and with the keyboard 160 and I/O controller 190 can detect whether a user is still attending to a previous notification. The tests can be applied singly or in different permutations.

If it is detected that the user is not attending to a previous notification, then at a step 320 the notification controller causes a notification to be displayed so as to notify the user of the newly detected event. At a step 330 the user may attend to the notification as described above, and the process ends in respect of that notification.

If however at the step 310 it is detected that the user is attending to the previous notification, then at a step 340 a detection is made as to whether the new notification is already in a queue maintained (in the memory 170) by the notification controller 210. If the notification is already in the queue, then the process ends. If not, then the new notification is added to the queue at a step 350 and the process ends. In this way, the notification controller 210 can be configured to defer any further notifications while the user is attending to a current notification using the user interface, until the user has finished attending to the current notification. The notification controller can achieve this by generating and/or maintaining a queue comprising any further notifications while the user is attending to a current notification using the user interface, and by providing notifications relating to the queue once the user has finished attending to the current notification.

The notifications are in response to a data processing event at that or another connected device. So, for example, the arrival of an email at the email server, the initiation of a chat or voice call at a remote server, or the current time reaching an alarm time stored by the TV receiver are each considered to be a data processing event giving rise to a notification.

As mentioned above, the process shown in FIG. 5 commences when either an entirely new notification is initiated or the notification controller detects that a notification is held in the queue. In the latter case, the process would be executed in respect of the notification at the head of the queue, which can be defined as, for example, the first-received notification in the queue or alternatively it could be defined as the most recently added notification in the queue. To avoid the processing overhead of running the process of FIG. 5 continuously, the notification controller 210 could check at predetermined intervals (such as every 60 seconds) whether a notification is held in the queue.

Queuing undisplayed notifications is just one possible outcome in the situation that a notification is inhibited from being displayed while the user is attending to a previous notification. Another outcome is that the notification controller automatically dismisses such newly received notifications if they cannot be displayed immediately because the user is still attending to a previous one. In another alternative, the notification controller could automatically dismiss a notification after it has been held in the queue for a predetermined period (such as five minutes) without being displayed to the user.

The system could be arranged so that the user attends to a notification using a different device. So, for example, the user could attend to a notification on the TV receiver 20 by operating the mobile telephone 30. In this case, the step 310 involves a test as to whether the user is busy attending to the notification on the mobile telephone 30.

Figure 5:
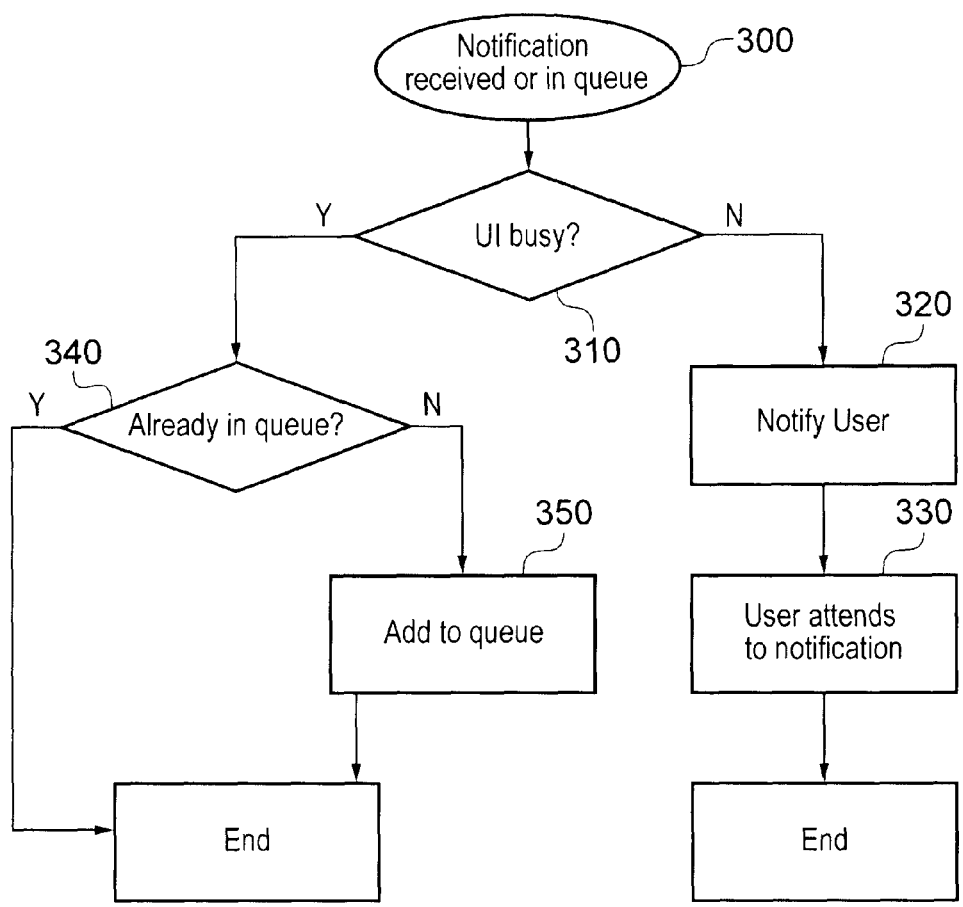
FIG. 5 is a schematic flowchart for dealing with notifications.

In a further modification of the arrangement of FIG. 5, the notification controller can maintain the priority data 220 of FIG. 3, which may be associated with different types of notification, the priority data defining whether a notification of a particular type should be allowed to be provided while the user is attending to a current notification. The priority data represents an order of precedence of notifications, and is relevant to a further possible test which can be interposed between the "yes" branch of the step 310 and the step 340 in FIG. 5, namely "Does the newly received notification have a higher position, in the priority data, than the notification that the user is currently attending to?" (which may be taken as the previous notification if it is not explicitly identified as part of the step 310).

If the answer to this additional test is "yes", then control is passed to the step 320 and the user is notified of the new notification even if the user is still attending to the previous notification. If the answer is no, then control passes to the step 340 as before.

The priority data could have the form shown below, where a lower-numbered priority level indicates a higher precedence, so that (for example) a priority 1 notification is higher in precedence than a priority 2 notification.

| Priority 1 | Voice and/or video call initiated by another user |
| | Doorbell activated by someone trying to enter the user's house |
| Priority 2 | Real-time chat message arrived |
| Priority 3 | Email message arrived |
| | Social network notification received |
| | SMS text message received |
| Priority 4 | System status messages |

Where two notifications have an equal level in the priority data, then the answer to the new test mentioned above will of course be "no" and control will pass to the step 340.

In another example of the use of priority data, if, for example, the device is a car radio receiver with a Bluetooth connection to a mobile telephone to provide hands-free calling, then traffic news bulletins could be considered as having priority 1 whereas a voice telephone call could be a priority 2. In this way, travel news will temporarily interrupt a voice call, whereas if the travel news has already started, a voice call will not interrupt the travel news. Alternatively, in a television receiver, a notification that the user has a voice call could be considered a higher priority than the user attending to an incoming email.

Another example of the use of priority data is that the queue (see the steps 340 and 350 in FIG. 5) of notifications for display can be maintained:

(a) in order of time of receipt of the notifications, so that when the UI ceases to be busy, the next notification to be notified to the user will be the earliest received notification regardless of its priority, or (b) in order of priority, so that a higher priority notification will be notified to the user in precedence to a lower priority notification that had been received earlier, or (c) as a combination of (a) and (b), so that the priority of a notification is used first to arrange the queue, but then the time of receipt is used to decide an order amongst notifications of equal priority.

Priority data can also be established between different sources of interruption. So, for example, an incoming email from Friend A can be set by the user (or detected by the notification controller—see below) to be higher priority than an incoming email from Friend B.

The priority data can be predetermined. Alternatively, the priority data can be initially established (for example, as a default set of predetermined data) but then the notification controller can modify or change the priority data in response to a detection (using the tests at the step 310) of which types of notification the user commonly responds and/or attends to. In this way, the system can detect which types of notification (from a predetermined set of types) the user responds to, and therefore considers important. For example, the notification controller can switch the priority positions of two notification types in the priority data if the user is (say) ten times more likely to respond to the lower priority notification type than the higher priority notification type.

In embodiments of the invention, the TV receiver 20 can automatically initiate a recording of a currently displayed programme in response to a user notification either being displayed or being attended to. This is therefore a supplementary step associated with the step 320 (if the recording is initiated in response to the notification being displayed) or with the step 330 (if the recording is initiated in response to the user attending to the notification). This means that if the user is distracted by a notification, the user can avoid missing part of the currently viewed programme.

The initiation of a recording can take various different forms:

(i) The TV receiver can start to record the currently displayed programme to the non-volatile storage 180 (for example a hard disc drive) but continue to display the programme. A user control is then provided to allow the user to replay the recorded programme from the start of the recording. In this instance, the recording and delayed replay will need to continue through to the end of the programme, so that the non-volatile storage 180 acts as a temporary buffer of a portion of the programme material.

(ii) The TV receiver can start to record the currently displayed programme to the non-volatile storage 180 (for example a hard disc drive) and pause the display of the programme. A user control is then provided to allow the user to continue the recorded programme from its paused position, and/or the replay from pause can be automatically initiated when the user has finished attending to a notification which caused the system to pause. In this instance, the recording and delayed replay will need to continue through to the end of the programme, so that the non-volatile storage 180 acts as a temporary buffer of a portion of the programme material.

(iii) If the TV receiver is already of the type that buffers displayed programmes to the non-volatile storage 180 to allow the user to pause live programmes, then at the time of the notification or the time of the user attending to that notification (as the case may be), the TV receiver can either initiate a pause using its existing arrangement, or it can continue to replay but also store a time marker (or flag) to indicate the time at which the notification was displayed or attended to. A user control can then be provided to skip back, in the recorded material, to the time corresponding to the time marker.

Some notifications affect the way in which the UI, particularly items like the keyboard 160, behave. For example, some notifications "take control" of certain UI controls such as an enter key, and become the foreground object which responds first to such a key being pressed. So, for example, if the user is typing without looking at the display 130 and such a notification appears, the user could continue to type so that either (a) the typing is applied to the notification rather than the application the user thought he was using, or (b) the typing is ignored until characters that the notification recognises (such as the enter key) are pressed. In either instance, this can be frustrating for the user.

Figure 6A:
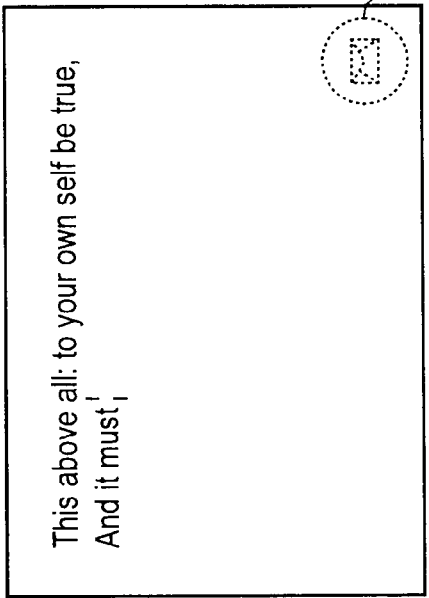
FIGS. 6*a* to 6*d* schematically illustrate a user display.
Figure 6B:
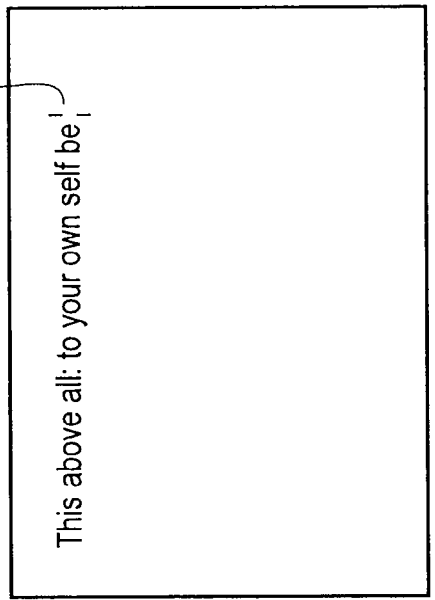
Figure 6C:
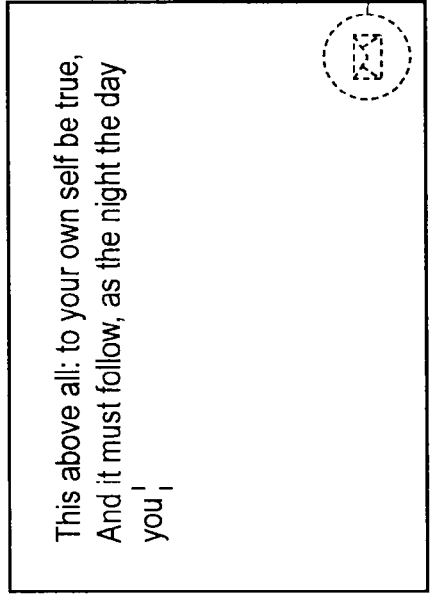
Figure 6D:

A solution to this is presented in FIGS. 6a to 6d, which schematically illustrate a display on which the user is typing using a text entry application such as a word processor. A current typing position is shown by a cursor 400. FIG. 6a illustrates the situation before a notification is displayed. In FIGS. 6b and 6c the notification 230" is displayed but with an associated delay period of perhaps five seconds. During the delay period, the displayed notification may be faded into view (as shown schematically in FIGS. 6b and 6c), but a technically significant feature is that during that delay period the displayed notification does not become the foreground object and so is not the object to which typing is directed. This allows the user to continue typing into the word processor application during the delay period and so to complete the typing up to the position shown in FIG. 6d before the displayed notification takes over as the foreground object to which typing is directed. An intention of this feature is to allow the user time to realise that a notification has been displayed (possibly with the aid of an audible notification as well) and so to be aware of which object is responding to the user's typing.

Further embodiments can relate to handling, for example, multiple email, SMS, social network or telephone conversations. Consider an example in which a user is contacted Friend A, by any of the communication means just mentioned. A notification is provided to the user of the incoming communication. If the user decides to attend to the notification, then one possibility is that any concurrent communication notifications from Friends B, C, D and so on are cached until the user has finished attending to the communication from Friend A.

Another possibility is that one or more of Friends B, C, D may have higher priority than Friend A, in which case their communication is notified even while the user is attending to Friend A. That priority might have been established before this round of communication, or could arise from the fact that (for example) Friend B is corresponding on the same subject as the original communication from Friend A, or perhaps is replying to the same email that Friend A sent to both Friend B and the user.

In the case of social networking chat communication, then if the user is already attending to a notification about a communication from one Friend, the notification relating to another Friend could be allowed but in the form of "do you want to allow [Friend B] to join this chat session". If the user's answer is "no" then the notification is returned to the queue, and is later (when the user has finished attending to the current notification) notified, but in the context of a request by Friend B for a one to one communication with the user.

In so far as embodiments of the invention have been described as being implemented, at least in part, by software-controlled data processing apparatus, it will be appreciated that such software, as well as a non-transitory machine-readable storage medium which carries such software (and which may be considered as a computer program product) such as an optical disk, a magnetic disk, semiconductor memory or the like, are considered to represent embodiments of the present invention.

Obviously, numerous modifications and variations of the present disclosure are possible in the light of the above teachings. It is therefore to be understood that within the scope of the appended claims the invention may be practised otherwise than as specifically described herein.

The invention claimed is:

1. A data processing device comprising:
notification processing circuitry configured to provide a notification to a user in response to a data processing event at the data processing device or at another data processing device connected to the data processing device; and
interface circuitry configured to provide a user interface to receive a first user input to attend to the notification to carry out a data processing task related to the data processing event, and a second user input indicating that the user has finished attending to the notification, wherein
the notification processing circuitry is further configured to
inhibit further notifications based on priority data when the interface circuitry begins to receive the first user input and until the interface circuitry receives the second user input,
maintain the priority data associated with different types of notifications, the priority data defining whether a notification of a particular type should be provided while the interface circuitry receives the first user input, and
change the priority data based on a number of times that each of the different types of the notifications has been attended to.

2. The data processing device according to claim 1, wherein the notification processing circuitry is further configured to defer any further notifications until the interface circuitry receives the second user input.

3. The data processing device according to claim 2, wherein the notification processing circuitry is further configured to:
generate a queue that includes the further notifications when the interface circuitry begins to receive the first user input; and
provide the further notifications to the user from the queue after the interface circuitry has received the second user input.

4. The data processing device according to claim 1, wherein
the data processing device is a receiver arranged to receive, and the data processing device is configured to play as a user output, audio/video content that is transmitted by a content provider.

5. The data processing device according to claim 4, further comprising:
a content recorder for recording the received content; and
recording processing circuitry configured to initiate a recording of the received content in response to the notification processing circuitry providing the notification.

6. The data processing device according to claim 5, wherein the recording processing circuitry is further configured to store a flag that indicates a time at which the recording was initiated.

7. The data processing device according to claim 5, wherein the data processing device is further configured to pause an output of the received content in response to the notification.

8. The data processing device according to claim 7, wherein the data processing device is further configured to resume the output of the received content when the interface circuitry receives the second user input.

9. The data processing device according to claim 1, wherein the notification is an audio and/or video notification.

10. The data processing device according to claim 1, wherein the notification processing circuitry is further configured to provide to the user, while the interface circuitry receives the first user input, a next notification that is faded into view.

11. A method of operating a data processing device, the method comprising:
providing, by circuitry, a notification to a user in response to a data processing event at the data processing device or at another data processing device connected to the data processing device;
receiving, by the circuitry, a first user input through a user interface to attend to the notification to carry out a data processing task relating to the data processing event;
receiving, by the circuitry, a second user input through the user interface, the second user input indicating that the user has finished attending to the notification;
inhibiting, by the circuitry, further notifications based on priority data when the circuitry begins to receive the first user input and until the circuitry receives the second user input;
maintaining, by the circuitry, the priority data associated with different types of notifications, the priority data defining whether a notification of a particular type should be provided while the circuitry receives the first user input; and
changing, by the circuitry, the priority data based on a number of times that each of the different types of the notifications has been attended to.

12. A non-transitory machine-readable medium that stores computer software for implementing the method of claim 11.

13. The method according to claim 11, further comprising:
playing, by the circuitry, a user output, audio/video content that is transmitted by a content provider.

14. The method according to claim 13, further comprising:
recording, by the circuitry, the content; and
initiating, by the circuitry, a recording of the content in response to the notification.

* * * * *